United States Patent

[11] 3,613,554

| [72] | Inventors | Edward B. Koger;<br>Dorothy G. Koger, both of 8040<br>Bobbyboyar Ave., Canoga Park, Calif.<br>91304 |
|---|---|---|
| [21] | Appl. No. | 780,681 |
| [22] | Filed | Dec. 3, 1968 |
| [45] | Patented | Oct. 19, 1971<br>Continuation-in-part of application Ser. No.<br>445,930, Apr. 6, 1965, now Patent No.<br>3,415,662. |

[54] LAMINATED COOKING PAD AND METHODS OF MAKING SAME
2 Claims, 8 Drawing Figs.

[52] U.S. Cl............................................. 99/446, 161/111
[51] Int. Cl........................................ A47j 27/00
[50] Field of Search............................ 99/171 H, 444, 445, 446; 161/111

[56] References Cited
UNITED STATES PATENTS

| 3,230,864 | 1/1966 | Krajewski............ | 99/446 |
| 2,251,372 | 8/1941 | Nicholson............ | 161/111 |
| 2,593,592 | 4/1952 | Miller.................. | 99/446 |
| 3,026,209 | 3/1962 | Niblack et al......... | 99/446 UX |
| 3,127,828 | 4/1964 | Fine..................... | 99/446 |
| 3,156,402 | 11/1964 | Dupuis................ | 99/171 H UX |
| 3,453,949 | 7/1969 | Levin.................. | 99/446 |

*Primary Examiner*—Daniel Blum
*Attorney*—Schellin & Hoffman

ABSTRACT: This specification discloses a laminated pad intended to be used in the cooking of foods, particularly meat. The pad is a laminated construction comprising a bottom layer of metallic foil, a comparatively thick intermediate layer of an absorbent material such as cellulose, and a top layer of metallic foil. The top and bottom layers initially are of greater extent than the absorbent layer so that protruding marginal portions may be folded about the side edges and joined to provide a complete envelop about the absorbent layer. The top layer is formed with a multiplicity of small openings through which grease or other food secretions drain to be absorbed the intermediate layer. In a modification a plurality of top foil layers are provided so that one may be peeled off to present a new layer after each usage. A method of fabricating such a pad is also disclosed in which the foil layers are integrally joined at one side so that after the absorbent pad is positioned they are folded and the remaining side edges joined.

PATENTED OCT 19 1971 3,613,554

INVENTORS
EDWARD B. KOGER &
DOROTHY G. KOGER

BY Schellin & Hoffman
ATTORNEYS

PATENTED OCT 19 1971 3,613,554
SHEET 2 OF 2

INVENTORS
EDWARD B. KOGER &
DOROTHY G. KOGER

BY *Schellin & Hoffman*
ATTORNEYS

LAMINATED COOKING PAD AND METHODS OF MAKING SAME

This application is a continuation-in-part of the copending application of the applicants', Ser. No. 445,930, filed Apr. 6, 1965, now U.S. Pat. No. 3,415,662, and entitled "LAMINATE MATERIAL."

The present invention relates to pads utilized in the cooking of foods, particularly the broiling of meats, and is concerned primarily with a pad that has the ability of absorbing the secretions from the foods caused by the cooking operation; and maintaining a high "flash" point of such secretions which might be caused by the cooking heat.

BACKGROUND OF THE INVENTION

When meat is broiled, secretions are generated. These secretions which comprise oils and fats are commonly identified as grease. This grease in an exposed, or free and open condition has a flashpoint and a fire point. The flashpoint is the temperature at which the products of decomposition of the grease will ignite if a flame is applied thereto but will not support combustion. The fire point is the temperature at which combustion is supported by the products of decomposition once they are ignited. The flashpoint is somewhat less than the fire point.

The temperature of the cooking heat for broiling meat is ordinarily higher than the flash or fire points of the grease that is secreted during the cooking operation. If this grease is absorbed as by an absorbent pad, it is not exposed and there is no danger of flashing. However, when such a pad reaches the saturation point and more grease is applied thereto, grease becomes exposed and creates the danger of flashing. It has been found that if the surfaces of such an absorbent pad are protected by a layer of metallic foil the flashpoint of the exposed grease, that is the grease that is present due to oversaturation, is heightened or increased, thus decreasing the danger of flashing.

It is a comparatively simple matter to cover the bottom and side surfaces of an absorbent pad with a layer of metallic foil. However, in providing a protective layer for the top surface, provision must be made for the grease to drain therethrough onto the absorbent pad.

SUMMARY OF THE INVENTION

The invention resides broadly in the provision of a cooking pad comprising an absorbent pad presenting top, bottom and side surfaces together with an imperforate layer of metallic foil covering the bottom and side surfaces and a layer of metallic foil that covers the top surface and which is formed with one or more holes, the size and number per unit area of which, will afford drainage of grease from the meat thereon to the absorbent pad, and at the same time raise the flashpoint of grease of oversaturation confined within the metallic foil.

In attaining this end, a pad is provided which consists essentially of a bottom layer of metallic foil, an intermediate relatively thick layer of absorbent material, and a top foil layer. The latter is formed with a plurality of openings. Thus, with a piece of meat positioned on the latter during broiling grease generated by the heat of cooking drains through the openings and is absorbed by the absorbent layer.

It is evident that the drainage of grease is an important aspect of the present invention. Thus, a further object is to provide, in a pad of the type noted, a top layer having openings of a diameter less than 0.0625 inches. Such an arrangement and hole size assures of effective drainage and prevents any grease from becoming directly exposed to the cooking heat.

As the meat is positioned on the top layer it is important that the bottom and sides be protected from direct exposure to the cooking heat. With this thought in mind, another object is to provide, in a pad of the character aforesaid, a bottom layer and sidewalls that are imperforate. Thus, all grease is retained within the absorbent layer and the latter is protected from the cooking heat. The ultimate result is that flashing or firing of the grease cannot occur until the saturation point of the absorbent layer is reached and liquid grease is exposed to an ignition source.

While there are several ways in which the foil layers may be formed to provide the sidewalls aforesaid an object is to provide, in a pad of the kind described, top and bottom layers which originally have an extent greater than that of the absorbent layer so that when the latter is positioned between the foil layers marginal portions are defined which protrude beyond the sides of the absorbent layer. These marginal portions are folded inwardly and united by crimping.

While it is entirely possible and practical to use one of these pads including a single top foil layer for more than one cooking operation it has been found that after one or a limited number of such cooking operations the openings in the top foil layer become clogged and obstructed before the absorbent layer is completely saturated. With this condition in mind a further object is to provide, in a pad of the type aforesaid, a plurality of top foil layers, all having the openings therein in alignment, and which are assembled on the pad in such a manner as to permit peeling off of the exposed top layer after one or more cooking operations to expose the layer therebeneath for subsequent cooking operations. This is repeated until the absorbent pad is saturated.

Another object is to provide a modified form of pad in which the top layer is secured to the absorbent layer by embossments the formation of which is accompanied by forming holes in the top layers, this arrangement being disclosed in the above-identified copending application.

Another highly important object is to provide a method of fabricating a pad embodying the above percepts which facilitates the manufacture thereof. In accordance with this method the top and bottom layers are integrally joined at one side. The absorbent layer is positioned on one of these whereupon the other is folded over the absorbent layer to leave three marginal portions protruding beyond the sides of the absorbent layers. These marginal portions are then folded about the sides of the absorbent layer and united as by crimping.

Various other more detailed objects and advantages of the invention such as arise in connection with carrying out the above-noted ideas in a practical embodiment will in part become apparent and in part be hereinafter stated as the description of the invention proceeds.

For a full and more complete understanding of the invention reference may be had to the following description and accompanying drawings wherein.

Figure 1:
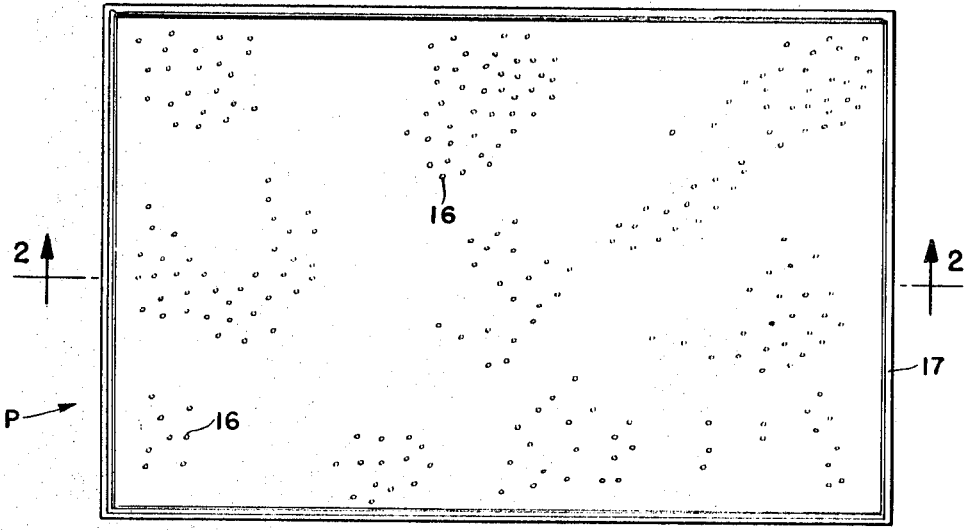
FIG. 1 is a top plan view of a cooking pad embodying the principles of this invention.
Figure 2:
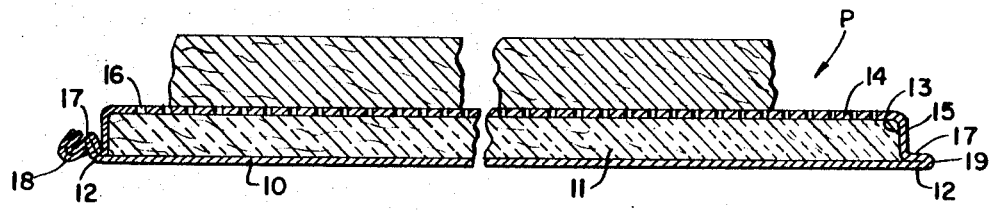
FIG. 2 is a vertical longitudinal section through the pad of FIG. 1, being taken about on the plane represented by the line 2—2 of FIG. 1, and with parts broken away to permit illustration on an enlarged scale.

Referring now to the drawings, and first more particularly to FIGS. 1 and 2 a pad is identified in its entirety by the reference character P. It is of rectangular shape and includes a bottom layer 10 of metallic foil. There are many foils that are suitable for the purposes of this invention but aluminum foil may be taken as the preferred material. The layer 10 is imperforate.

Superposed on the foil layer 10 is an intermediate layer 11 of absorbent material. Cellulose fibers, or a composition including such fibers, have proven to be effective for their absorbent properties. The layer 11 is relative thick as compared to the foil 10 and has a large absorbent capability. Its extent is less than that of the layer 10 so that when it is placed thereon there are marginal portions 12 of layer 10 which protrude beyond the sides 13.

A top layer 14 of the same metallic foil has a central portion coextensive with the absorbent layer 11. Integrally joined to this central portion at the side edges thereof are sidewall portions 15 which overlie and engage the sides 13 of the absorbent pad. The portion of layer 14, that is the part which overlies the top of layer 11 is formed with a plurality of small openings 16. The size of the latter are somewhat exaggerated in FIG. 2 to permit illustration. They are of a diameter of 0.0625 square inches or less with substantially 0.0625 inches being the preferred embodiment. This size is of importance because it provides for drainage and at the same time the effectiveness of the top foil 14 as a guard for the absorbent layer 11 is not impaired.

The relation of the number of holes to the surface area is critical as to a certain range. Thus it has been found that with any number of holes per unit area up to 64 of such holes per square inch the flashpoint is 635° F. This same flashpoint is maintained when the number of holes is reduced to five per square inch. When the number was reduced to one per square inch, the flashpoint was raised to 650° F. Thus, the holes should be present in the range of one to 64 per square inch. The latter number is substantially the limit at which physical integrity in the foil can be maintained.

Extending outwardly from the lower edges of the sidewalls 15 and integrally joined thereto are marginal portions 17 that are crimped to the marginal portion 12 of the bottom layer 11 with the crimping being shown at 18.

It is to be understood that the crimps 18 are illustrated and described solely as the preferred means of joining the marginal portions of the top and bottom layers as other well-known means could be employed such as simple folding or adhesives.

While it is entirely possible and practical to initially form the foil layers 10 and 14 as separate elements it is believed that fabrication of the pads is facilitated if the two are originally formed as one piece and integrally united on one side as by the bend shown at 19 in FIG. 2.

Figure 7:
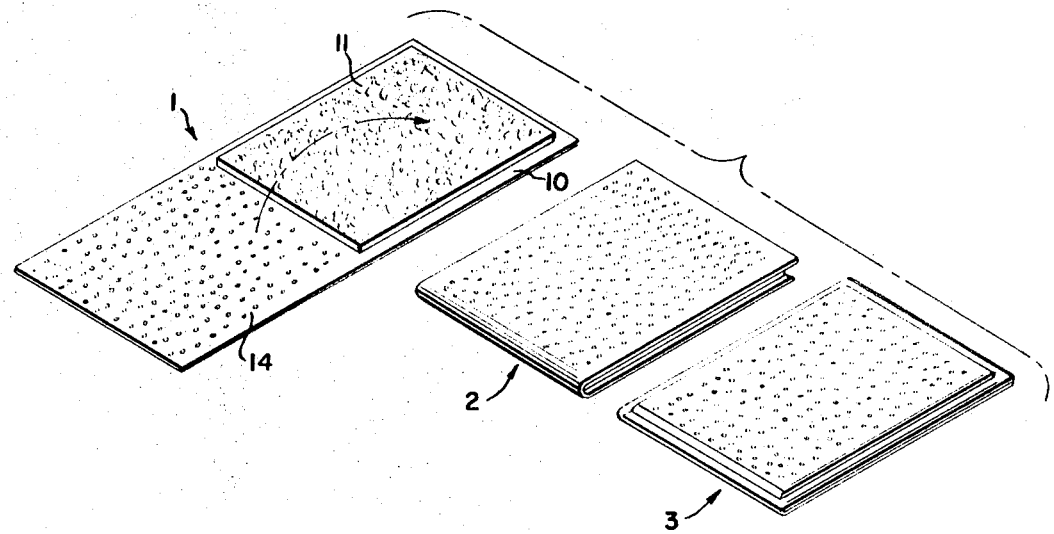
FIG. 7 is a perspective developing the steps of the method of fabrication in exploded relation.

This method of fabrication is illustrated in FIG. 7. Thus at step 1, the foil layers 10 and 14, integrally joined by the material at bend 12 are disposed in a flattened-out condition and absorbent layer 11 positioned on layer 10 to leave the marginal portions of the latter on three sides as illustrated.

At step 2, the top layer 14 is folded over into engagement with the top of absorbent layer 11. At step 3, the marginal portions 12 and 17 on the three sides other than that at which the bend 19 is located are crimped in the manner now to be described and a crimp is also formed at the bend 12.

Figure 5:
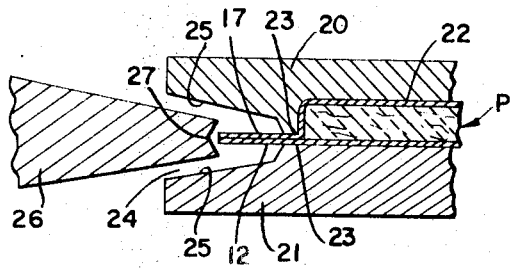
FIG. 5 is a detailed section depicting an initial stage of the crimping operation.
Figure 6:
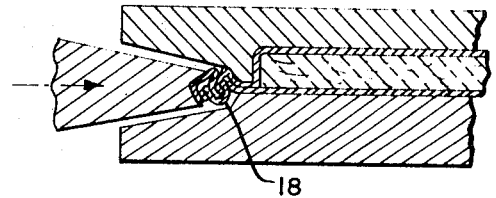
FIG. 6 is a view similar to FIG. 5 illustrating the position of the crimping tool at the completion of the crimping operation.

Referring now to FIGS. 5 and 6 complemental mold or die elements are shown at 20 and 21. The die 20 has a recess 22 which receives pad P. Where the dies meet there are narrowly spaced confronting surfaces 23 which receive therebetween the marginal portions 12 and 17. The latter project into a recess 24 defined by inclined faces 25 on the respective dies.

A crimping tool 26 has a V-shaped groove 27 which initially confronts the edges of marginal portions 12 and 17 as depicted in FIG. 5. The tool 26 is moved inwardly under pressure to form the crimp 18 as shown in FIG. 6. It is evident that crimp 18 is formed by being compressed within the V-groove 27, faces 25 and portions of the dies 20 and 21 adjacent to the surfaces 23.

Figures 3, 4:
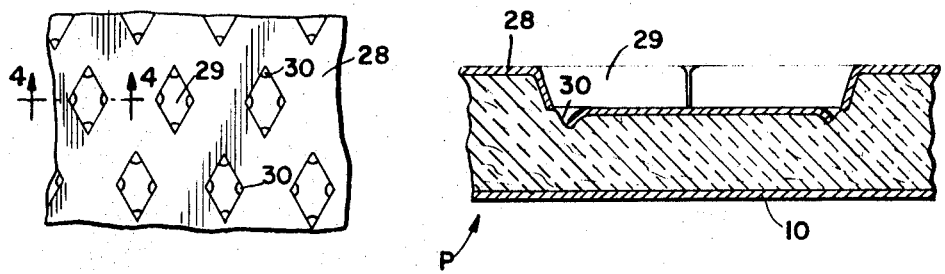
FIG. 3 is a fragmentary plan view of a modified form of pad.
FIG. 4 is a sectional detail, taken on an enlarged scale of a portion of the pad of FIG. 3, being taken about on the plane represented by the line 4—4 of FIG. 3.

Referring now to FIGS. 3 and 4, a modified form of a pad including a top layer that is somewhat different from the layer 14 will be described. The pad P is shown as including the usual bottom layer 10 and absorbent layer 11. A top metallic foil layer 28 is formed with a plurality of embossments 29. The latter are depressed into absorbent layer 11 as shown in FIG. 4. While embossments 29 may be of varied shape in a preferred embodiment they are diamond shaped as illustrated.

Simultaneously with their formation openings 30 are formed at each corner of the diamond. These openings 30 perform the drainage function of the openings 16 of FIGS. 1 and 2.

Figure 8:
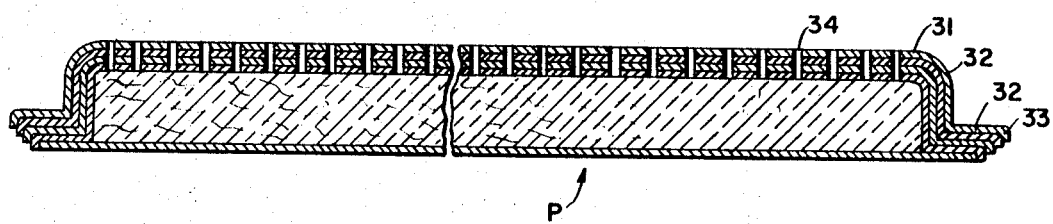
FIG. 8 is a vertical section through a modification including a plurality of top layers, with parts broken away.

In FIG. 8, the pad P includes a plurality of nested top metallic foil layers 31. Each of the latter includes sidewalls 32 from which outstand marginal portions 32. The latter terminate in down-turned lips 33 which maintain the assembled relation. Openings 34 in the several top layers are in alignment. Thus, the uppermost exposed layer may be removed, as by peeling back, after a period of usage and the layer immediately therebeneath exposed for another cooking operation.

To the end of clearly establishing the importance of size of holes 16, certain tests and experiments were conducted. The results of these tests are set forth in table I. By way of explanation, it is noted that the flashpoint is the temperature at which the products of decomposition of the oil or grease will ignite if a flame is applied thereto but will not support combustion. The fire point is the temperature at which combustion is supported by the products of decomposition once they are ignited.

TABLE I. EFFECT OF SURFACE COVERING ON FLASH AND FIRE POINTS OF OILS AND FATS

| Oil or Fat | Covering Material | Hole Size In. | Flash Point °F | Fire Point °F |
|---|---|---|---|---|
| Corn Oil | None | | 605 | 670 |
| Do | Cellulosic Absorbent | | none | 670 |
| Do | Aluminum Foil | 0.0937 | 605 | 670 |
| Do | do | 0.0625 | 637 | 670 |
| Do | do | 0.0285 | 650 | 675 |
| Do | do | 0.0185 | 670 | 675 |
| Cottonseed Oil | None | | 610 | 665 |
| Do | Cellulosic Absorbent | | none | 665 |
| Do | Aluminum Foil | 0.0937 | 610 | 665 |
| Do | do | 0.0625 | 642 | 665 |
| Do | do | 0.0285 | 660 | 670 |
| Do | do | 0.0185 | 660 | 670 |
| Lard | None | | 615 | 670 |
| Do | Aluminum Foil | 0.0937 | 615 | 670 |
| Do | do | 0.0625 | 655 | 675 |
| Do | do | 0.0285 | 668 | 680 |
| Do | do | 0.0185 | 675 | 680 |

An absorbent pad embodying the basic principles of this invention may be produced by other methods, continuous in nature.

In one of these methods, the bottom foil layer is a continuous strip and the absorbent pads 11 deposited thereon individually and in properly spaced relation. After this placing the foil is severed to define individual laminated pads. After placing top layers of foil on the absorbent pads the four sides of the foil layers are crimped. In a modification, the absorbent elements are spaced sufficiently apart to leave enough of the continuous strip to form a sidewall or a fold and the top layer. In this method, the remaining three sides are crimped.

In another method the absorbent material is run as a continuous strip as are the foil layers with the absorbent layer therebetween but leaving marginal strips of the foil at the side edges of the absorbent. All the layers are then severed to define individual pads and all side edges of the latter are crimped.

While preferred specific embodiments of the invention are hereinbefore set forth, it is to be clearly understood that the invention is not to be limited to the exact constructions, materials and steps illustrated and described because various modifications of these details may be provided in putting the invention into practice within the purview of the appended claims.

What is claimed is:

1. In a laminated cooking pad, an intermediate layer of absorbent material presenting top, bottom, and side surfaces, imperforate layers of a metallic foil covering said bottom and side surfaces, and a top layer of metallic foil having a plurality of diamond-shaped embossments penetrating into the absorbent layer, and openings formed at the corners of said diamond-shaped embossments, said openings being of a diameter ranging from 0.0185 inch to 0.0625 inch and being present in the amount of from five to 64 per square inch whereby an increased flashpoint is caused by the absorbent material preventing the grease from being exposed to an ignition source and the absorbent material is effective until it becomes completely saturated with grease and the liquid grease is exposed to the ignition source, at that point the presence of the perforated upper layer is effective in increasing the resistance to flashing.

2. In a laminated cooking pad, an intermediate layer of absorbent material presenting top, bottom, and side surfaces, imperforate layers of a metallic foil covering said bottom and side surfaces, and at least two top layers of metallic foil, each having a plurality of openings permitting drainage of grease from a piece of meat thereon to said absorbent pad, the openings in one of said top layers being in alignment with the openings in the adjacent top layer, the marginal portion of each top layer having a depending lip overlying the corresponding lip of the next adjacent top layer with the exception of the innermost top layer the lips of which overlie the edges of the bottom layer, said openings being of a diameter ranging from 0.0185 inch to 0.0625 inch and being present in the amount of from five to 64 per square inch whereby an increased flashpoint is caused by the absorbent material preventing the grease from being exposed to an ignition source and the absorbent material is effective until it becomes completely saturated with grease and the liquid grease is exposed to the ignition source, at that point the presence of the perforated upper layers is effective in increasing the resistance to flashing.